(No Model.)
J. E. WELLING.
EGG BEATER.
No. 321,327. Patented June 30, 1885.
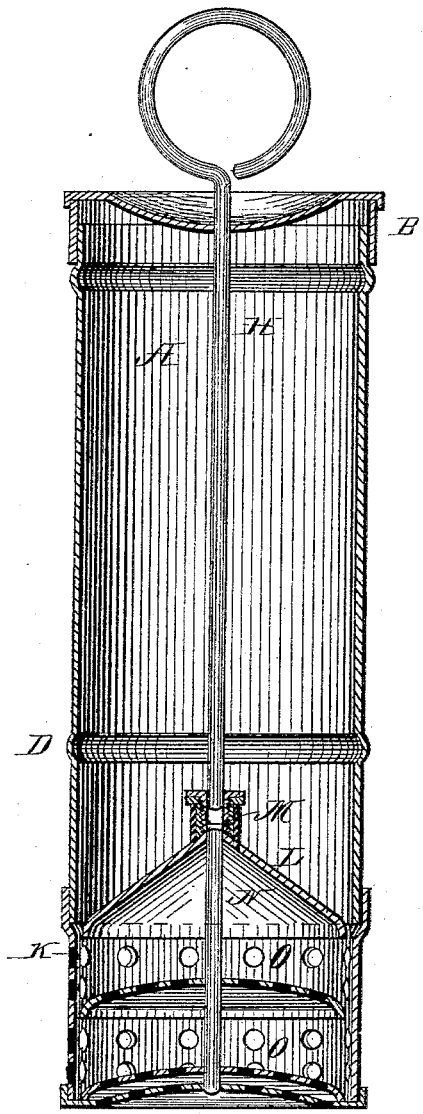

United States Patent Office.

JOHN EDWARD WELLING, OF GEORGETOWN, KY., ASSIGNOR OF TWO-THIRDS TO JAMES E. CANTRILL AND JUSTICE WEBB, BOTH OF SAME PLACE.

EGG-BEATER.

SPECIFICATION forming part of Letters Patent No. 321,327, dated June 30, 1885.

Application filed November 20, 1884. (No model.)

*To all whom it may concern:*

Be it known that I, JOHN E. WELLING, a citizen of the United States, and a resident of Georgetown, in the county of Scott and State of Kentucky, have invented certain new and useful Improvements in Egg-Beaters; and I do hereby declare that the following is a full, clear, and exact description of the invention, which will enable others skilled in the art to which it appertains to make and use the same, reference being had to the accompanying drawing, which forms a part of this specification, and which represents a sectional view of my invention.

This invention relates to combined egg-beaters and cream-whippers; and it has for its object to provide a device of this class which shall possess superior advantages in point of simplicity, durability, and general efficiency, and which may be readily converted from an egg-beater into a cream-whipper by a simple detachment and substitution of some of its parts.

With these ends in view the invention consists in the improved construction and arrangement of parts, which will be hereinafter fully described, and particularly pointed out in the claims.

In the drawing hereto annexed, A designates a cylindrical casing, the upper end of which is provided with a tightly-fitting and detachable cover, B, and the lower end of which has a detachable bottom, K, sliding upon the said cylindrical body and retained in position by friction against the latter. This bottom K is constructed of perforated sheet metal, and has a flat bottom of the same material. H is a suitable handle, of wire or other light material, the upper end of which passes through a perforation in the cover B, and having a screw-thread at its lower end, which is connected with an imperforated conical piece, L, having a screw-threaded socket, M, and provided with a downwardly-extending stem, N, upon which one or more perforated disks, O O, are secured. The lower perforated end of the casing is now inserted into the dish containing the eggs to be beaten or cream to be frothed, and the dasher is then reciprocated vertically, thus effecting the desired result speedily and effectually.

By the construction of the device as herein described the cost of manufacture is reduced to a minimum, and an article is produced which is eminently useful for the purposes for which it is intended, and which, after use, may be easily and thoroughly cleaned.

I am aware that it is not new to use perforated dashers, or perforated dashers in perforated cans, and I do not claim such construction, broadly; but

I claim and desire to secure by Letters Patent of the United States—

1. In a combined egg-beater and cream-whipper, the combination, with a bottomless cylindrical can, of a bottom having a perforated rim the upper part of which closely fits the bottom of said can, a dasher, a suitable handle for operating said dasher within said can and bottom part, and a perforated cover fitting the top of said can, substantially as and for the purpose set forth.

2. The combination, with a bottomless cylindrical can, of a perforated bottom having a perforated flange or rim, a dasher fitting in said can composed of a number of circular disks secured on a central shaft, the lower ones of which are perforated and the top one has a screw-threaded lug secured to its central portion, a handle the lower end of which is screw-threaded, and a suitable centrally-perforated cover, all combined substantially as shown, and for the purpose set forth.

In testimony that I claim the foregoing as my own I have hereunto affixed my signature in presence of two witnesses.

JOHN EDWARD WELLING.

Witnesses:
J. EUGENE BARNES,
M. B. SMITH.